United States Patent
Koshii et al.

(10) Patent No.: US 12,436,197 B2
(45) Date of Patent: Oct. 7, 2025

(54) CONTROL DEVICE, CONTROL METHOD, AND NON- TRANSITORY STORAGE MEDIUM

(71) Applicant: TOYOTA JIDOSHA KABUSHIKI KAISHA, Toyota (JP)

(72) Inventors: Takaya Koshii, Nagoya (JP); Hiroki Onoyama, Anjo (JP); Toshiki Shinohara, Toyota (JP); Kohei Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 18/319,578

(22) Filed: May 18, 2023

(65) Prior Publication Data

US 2023/0393212 A1 Dec. 7, 2023

(30) Foreign Application Priority Data

Jun. 7, 2022 (JP) ................................ 2022-092523

(51) Int. Cl.
*G01R 31/3842* (2019.01)
*B60R 16/023* (2006.01)
*B60R 16/033* (2006.01)
*G01R 19/10* (2006.01)

(52) U.S. Cl.
CPC ...... *G01R 31/3842* (2019.01); *B60R 16/0231* (2013.01); *B60R 16/033* (2013.01); *G01R 19/10* (2013.01)

(58) Field of Classification Search
CPC ............... G01R 31/3842; G01R 19/10; B60R 16/0231; B60R 16/033; Y02T 10/70
See application file for complete search history.

(56) References Cited

U.S. PATENT DOCUMENTS

2024/0010143 A1* 1/2024 Murakami ......... G01R 31/3842

FOREIGN PATENT DOCUMENTS

| JP | 2018-52176 A | 4/2018 | |
| JP | 2020-114079 A | 7/2020 | |
| WO | WO-2011036784 A1 * | 3/2011 | .......... B60L 11/1816 |

* cited by examiner

*Primary Examiner* — Christopher E Mahoney
(74) *Attorney, Agent, or Firm* — Oblon, McClelland, Maier & Neustadt, L.L.P.

(57) ABSTRACT

A control device that controls a battery includes one or more processors configured to: acquire a physical quantity of the battery; detect a predetermined signal; control a relay based on the physical quantity of the battery, the relay being connected between the battery and a predetermined device to which power is supplied from the battery; connect the relay when the physical quantity of the battery has continuously satisfied a predetermined condition for a first time period while the relay is in a disconnected state; and change the first time period depending on whether the predetermined signal has been detected by the one or more processors.

8 Claims, 4 Drawing Sheets

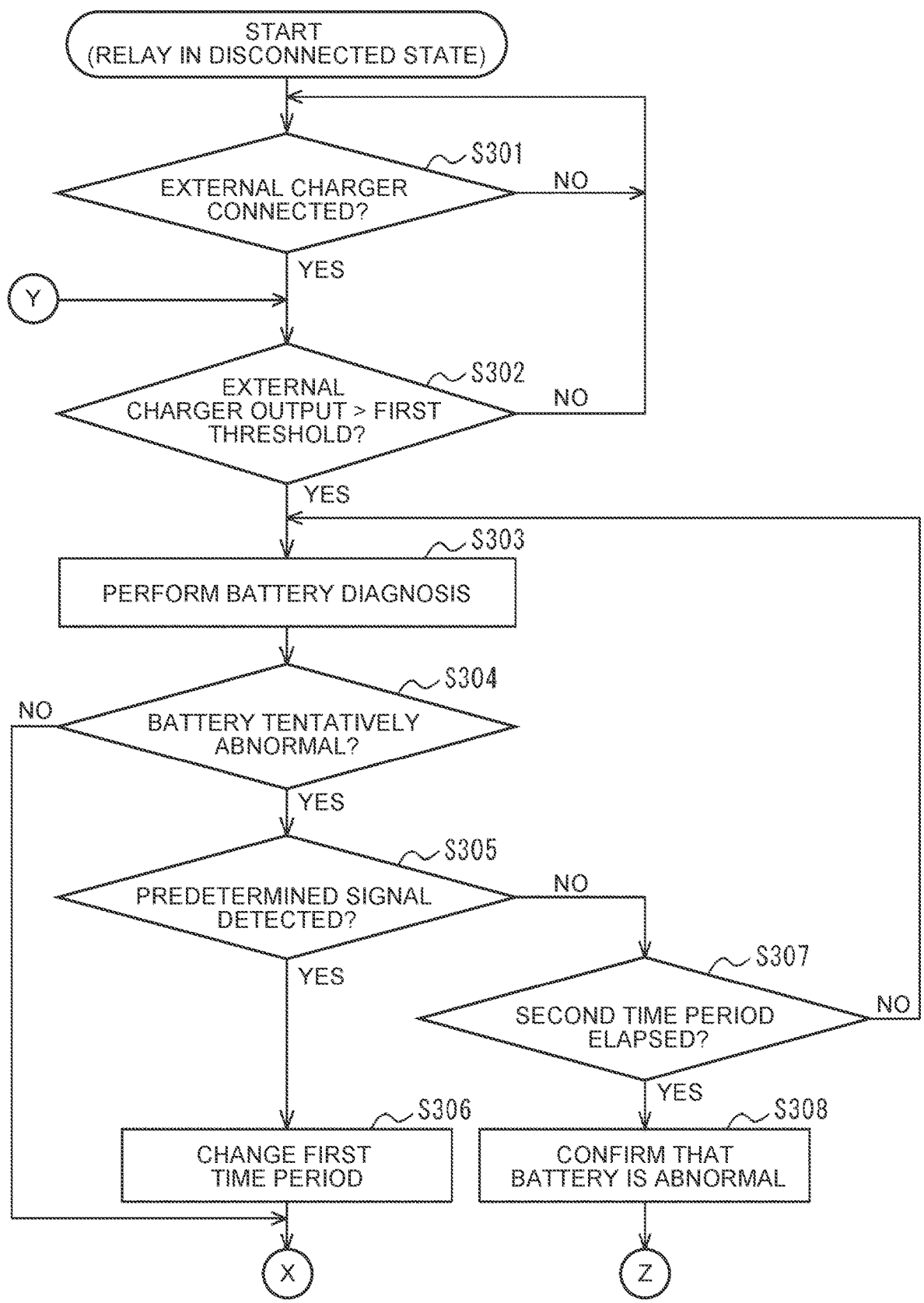

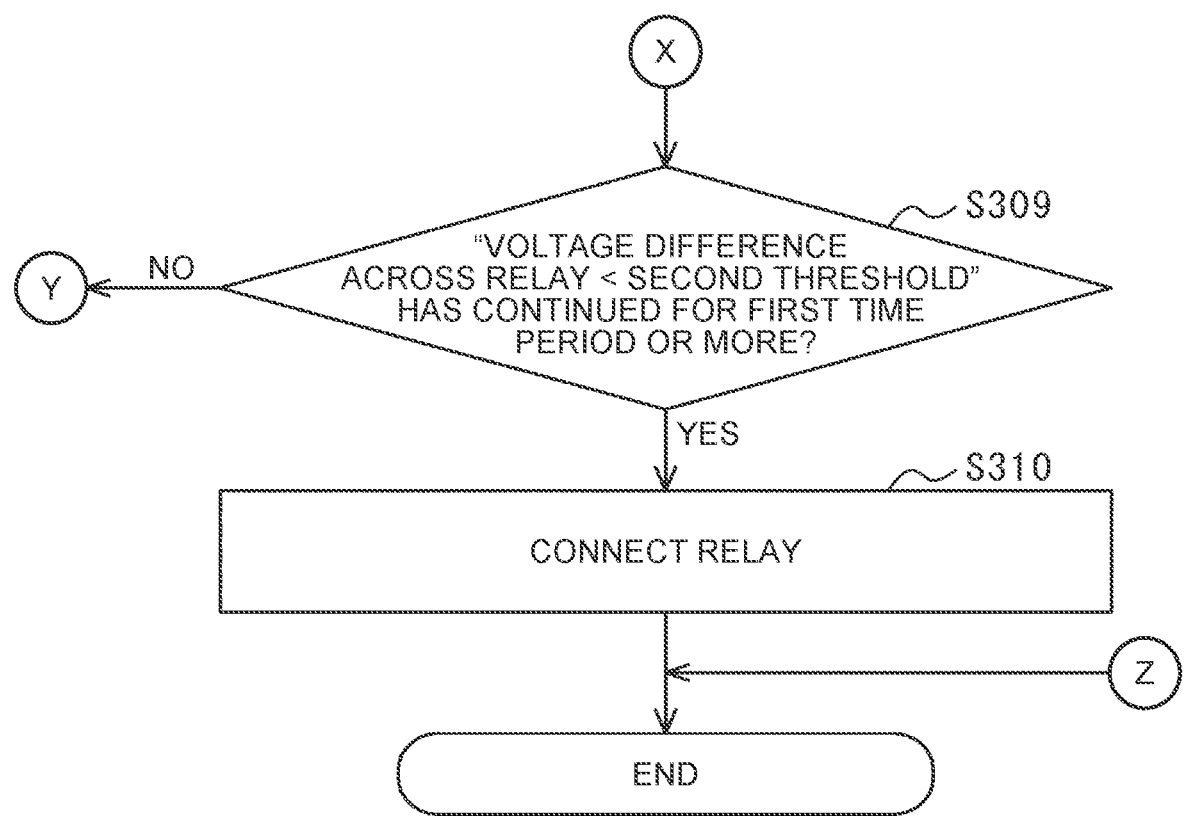

CONTROL DEVICE, CONTROL METHOD, AND NON-TRANSITORY STORAGE MEDIUM

CROSS-REFERENCE TO RELATED APPLICATION

This application claims priority to Japanese Patent Application No. 2022-092523 filed on Jun. 7, 2022, incorporated herein by reference in its entirety.

BACKGROUND

1. Technical Field

The present disclosure relates to control devices, control methods, and non-transitory storage media.

2. Description of Related Art

The following technique is used in vehicles using a lithium-ion battery (LiB) as an auxiliary battery. When a predetermined state occurs, the auxiliary battery is electrically disconnected from a vehicle system by a relay in order to ensure the safety of the vehicle system and protect the battery.

When the auxiliary battery is electrically disconnected from the vehicle system, it is necessary to electrically reconnect the auxiliary battery to the vehicle system in order to start the vehicle. Japanese Unexamined Patent Application Publication No. 2020-114079 (JP 2020-114079 A) discloses a control device that detects connection of an external power supply and switches a relay disconnecting an auxiliary battery from a vehicle system from a disconnected state to a connected state.

SUMMARY

When the output of a power supply connected to the vehicle, such as external charger, is low, the vehicle system may not be able to be started due to lack of enough power to start the vehicle system. It is therefore necessary to appropriately determine when to switch the relay from the disconnected state to the connected state based on the state of the vehicle, the state of the power supply such as external charger, etc. and then control switching of the relay.

The present disclosure provides a control device, control method, and non-transitory storage medium that can appropriately control switching of a relay from a disconnected state to a connected state.

A control device according to a first aspect of the present disclosure controls a battery. The control device includes one or more processors configured to: acquire a physical quantity of the battery; detect a predetermined signal; control a relay based on the physical quantity of the battery, the relay being connected between the battery and a predetermined device to which power is supplied from the battery; connect the relay when the physical quantity of the battery has continuously satisfied a predetermined condition for a first time period while the relay is in a disconnected state; and change the first time period depending on whether the predetermined signal has been detected by the one or more processors.

A control method according to a second aspect of the present disclosure is performed by a computer of a control device that controls a battery. The control method includes: acquiring a physical quantity of the battery; detecting a predetermined signal; connecting a relay when the physical quantity of the battery has continuously satisfied a predetermined condition for a first time period while the relay is in a disconnected state, the relay being connected between the battery and a predetermined device to which power is supplied from the battery; and changing the first time period depending on whether the predetermined signal has been detected.

A non-transitory storage medium according to a third aspect of the present disclosure stores instructions that are executable by one or more processors of a control device that controls a battery and that cause the one or more processors to perform functions. The functions include: acquiring a physical quantity of the battery; detecting a predetermined signal; connecting a relay when the physical quantity of the battery has continuously satisfied a predetermined condition for a first time period while the relay is in a disconnected state, the relay being connected between the battery and a predetermined device to which power is supplied from the battery; and changing the first time period depending on whether the predetermined signal has been detected.

According to the above control device, control method, and non-transitory storage medium of the present disclosure, the first time period to be used to determine whether to connect the relay is dynamically changed depending on whether the predetermined signal has been detected. Therefore, switching of the relay from the disconnected state to the connected state can be appropriately controlled according to the condition of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a flowchart of relay control of a second example that is performed by the control device; and FIG. 3B is a flowchart of the relay control of the second example that is performed by the control device.

DETAILED DESCRIPTION OF EMBODIMENTS

A control device of the present disclosure determines, based on information on a battery and an external charger etc., the condition of a vehicle in which it is desirable to connect a relay and the condition of the vehicle in which priority should be given to connecting the relay, and switches the relay from a disconnected state to a connected state. Appropriate switching of the relay can be implemented by this control. An embodiment of the present disclosure will be described in detail below with reference to the drawings.

Embodiment

Configuration

Figure 1:
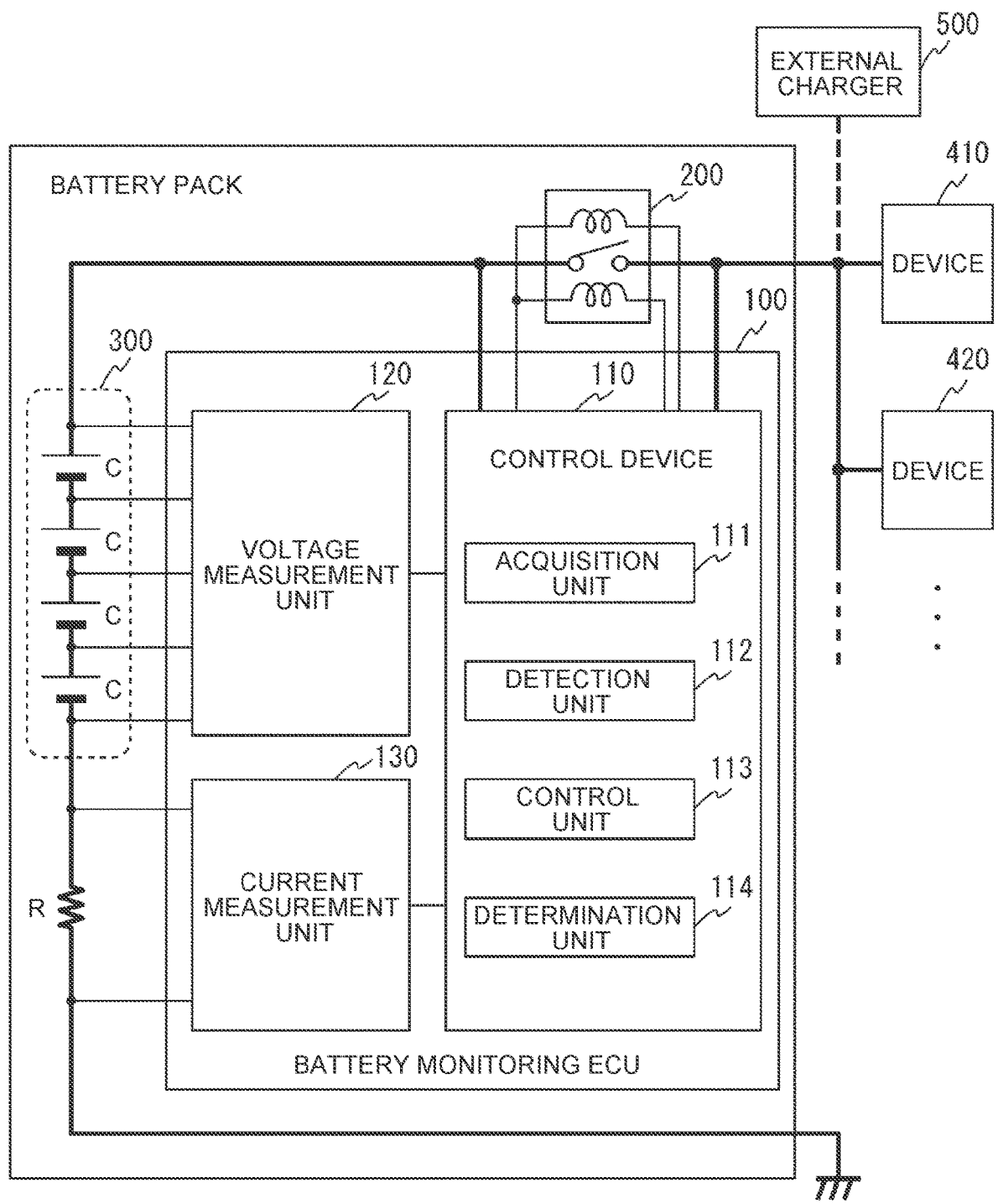
FIG. 1 is a functional block diagram of a control device and its peripheral components according to an embodiment.

FIG. 1 is a functional block diagram of a control device 110 and its peripheral components according to an embodiment of the present disclosure. The functional blocks illustrated in FIG. 1 include a battery pack, a plurality of devices 410, 420, and an external charger 500. The battery pack includes a battery monitoring electronic control unit (ECU) 100, a relay 200, and a battery 300. This battery pack is used in, for example, vehicles such as automobiles using an internal combustion engine as a power source and hybrid electric vehicles (HEVs) using an electric motor as a power source.

The battery 300 is a battery for supplying electric power to the devices 410, 420 via the relay 200. For example, the battery 300 is composed of a plurality of rechargeable secondary battery cells C such as lithium-ion battery cells connected in series. The battery 300 can be used as a so-called auxiliary battery that is used to supply electric power to devices that are not involved in driving the vehicle.

The relay 200 is a switch provided (connected) between the battery 300 and the devices 410, 420 and external charger 500. The relay 200 switches between a conducting state (ON) in which its terminals are electrically connected to each other and a non-conducting state (OFF) in which its terminals are electrically disconnected from each other, as controlled (instructed) by the battery monitoring ECU 100. An example of the relay 200 is a normally-on single pole single throw switch.

The devices 410, 420 are predetermined devices connected to the battery 300, and are devices that are operated by electric power supplied from the battery 300 via the relay 200. The number of devices 410, 420 is not limited to that shown in FIG. 1. In the case where the battery 300 is used as an auxiliary battery for a vehicle, examples of the devices 410, 420 include auxiliaries including actuators such as motors and solenoids, lights such as headlights and interior lights, air conditioning units such as heater and cooler, steering, brakes, and electronic control units (ECUs) for autonomous driving and advanced driver assistance.

The external charger 500 is a predetermined device that is connected to the battery 300, and is a charger intended to charge the battery 300. The external charger 500 can be attached and detached by a user of the vehicle etc. The external charger 500 includes not only a charger to be used in an emergency such as when the battery runs out, but also a charger to be used during normal operation in order to use the devices 410, 420 etc. The external charger 500 can be connected to a power supply line that connects the relay 200 and the devices 410, 420, and can supply a charge current to the battery 300 via the relay 200. Part of the charge current is supplied to the battery monitoring ECU 100 for power supply, and is also provided for consumption by the devices 410, 420.

The battery monitoring ECU 100 monitors and controls the state of the battery 300 and controls the connection state of the relay 200. The battery monitoring ECU 100 includes the control device 110, a voltage measurement unit 120, and a current measurement unit 130. The control device 110 includes an acquisition unit 111, a detection unit 112, a control unit 113, and a determination unit 114.

The acquisition unit 111 acquires physical quantities of the battery 300 from the voltage measurement unit 120 and the current measurement unit 130 or from a configuration, not shown. Examples of the physical quantities of the battery 300 include voltage, current, and temperature.

The detection unit 112 detects a predetermined signal. The predetermined signal is a signal based on which establishment of communication between the vehicle and the battery pack can be recognized. Typically, the predetermined signal is a signal indicating that communication (Controller Area Network (CAN), Local Interconnect Network (LIN), etc.) has been established between the battery monitoring ECU 100 and a predetermined system involved in operation of the vehicle. An example of the predetermined system involved in operation of the vehicle is an HV-ECU that controls traveling of the vehicle in hybrid mode. When the battery monitoring ECU 100 can communicate with the HV-ECU and the state of the HV-ECU transitions, it can be determined that an occupant has an intention to start the vehicle, or it can be determined that a tentative abnormality of the battery 300, which will be described later, is not a failure of the body of the battery 300 but a failure of a sensor etc. Therefore, detection of this signal is performed.

The determination unit 114 performs battery diagnosis to determine the state of the battery 300. More specifically, the determination unit 114 performs battery diagnosis to determine whether there is any predetermined abnormality related to the battery 300, based on the physical quantities of the battery 300 acquired by the acquisition unit 111. The predetermined abnormalities determined by this battery diagnosis include not only an abnormality of the body of the battery 300, but also abnormalities (failures etc.) of various sensors that are used to acquire the physical quantities of the battery 300 and abnormalities (disconnections etc.) of connection wires. The determination unit 114 determines whether the current, voltage, and temperature of the battery 300 have been equal to or greater than predetermined thresholds for predetermined time periods or more, and thus determines whether there is any abnormality related to the battery 300. The predetermined thresholds and the predetermined time periods are set for the current, voltage, and temperature of the battery 300.

The control unit 113 determines whether the external charger 500 is connected to the vehicle. More specifically, the control unit 113 determines whether the external charger 500 is connected to the power supply line between the relay 200 and the devices 410, 420. Whether the external charger 500 is connected to this power supply line can be determined by, for example, the control device 110 detecting a voltage change in the power supply line. The control unit 113 also determines whether the external charger 500 connected to the vehicle has been able to output a value required for predetermined control related to starting of the vehicle. The control unit 113 also switches the connection state of the relay 200 between the conducting state (ON) and the non-conducting state (OFF). This switching of the state of the relay 200 is dynamically controlled based on the physical quantities of the battery 300, the detection result of the predetermined signal from the detection unit 112, the voltage difference across the relay 200 (between one end and the other end of the relay 200), the battery diagnosis result from the determination unit 114, etc. This relay control will be described later.

The voltage measurement unit 120 measures the voltage of the battery 300. A voltage sensor, not shown, etc. is used to measure the voltage of the battery 300. The voltage measured by the voltage measurement unit 120 is output to the control device 110.

The current measurement unit 130 measures the current (discharge current and charge current) flowing through the battery 300. A current sensor (not shown) etc. that can detect the current flowing through a load R inserted in series with the battery 300 is used to measure the current flowing through the battery 300. The current measured by the current measurement unit 130 is output to the control device 110.

The control device 110 can be typically configured as one or more ECUs including one or more processors, one or more memories, and one or more input and output interfaces, etc. The control device 110 of the present embodiment can implement all or part of the above functions of the acquisition unit 111, the detection unit 112, the control unit 113, and the determination unit 114 by the processor(s) reading and executing programs stored in the memory(ies).

Control

Figure 2:
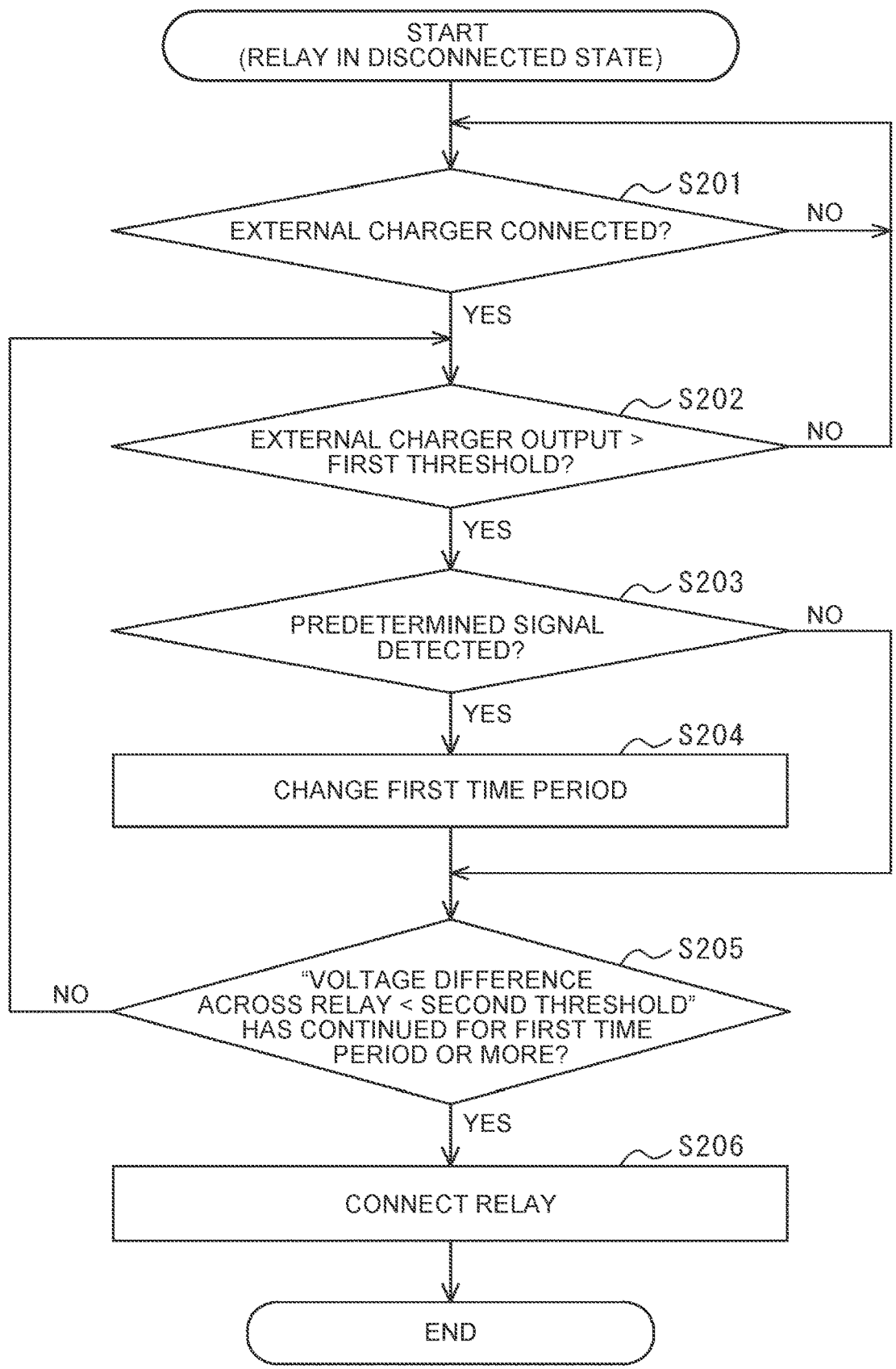
FIG. 2 is a flowchart of relay control of a first example that is performed by the control device.

Control that is performed by the control device 110 according to the present embodiment will be described with further reference to FIGS. 2, 3A, and 3B. FIG. 2 is a flowchart of a process of relay control of a first example that is performed by the configurations of the control device 110. FIGS. 3A and 3B are flowcharts of a process of relay control of a second example that is performed by the configurations of the control device 110. The process of FIG. 3A and the process of FIG. 3B are connected by connectors X, Y, and Z.

First Example

The relay control of the first example shown in FIG. 2 is started when the relay 200 is switched to the non-conducting state (OFF) in which the relay 200 is electrically disconnected. Examples of the situation where the relay 200 is switched to the non-conducting state (OFF) in this first example include: when the amount of power stored in the battery 300 becomes larger than a predetermined upper limit (overcharged state); when the amount of power stored in the battery 300 becomes less than a predetermined lower limit (over-discharged state); when the temperature of the battery 300 becomes higher than a predetermined upper limit (overheat state); and when the vehicle has been continuously parked for a long period of time (has been left for a long period of time).

Step S201

The control unit 113 determines whether the external charger 500 is connected to the vehicle. More specifically, the control unit 113 determines whether the external charger 500 is connected to the power supply line between the relay 200 and the devices 410, 420 as a specific operation required to connect the disconnected relay 200. When the control unit 113 determines that the external charger 500 is connected to the vehicle (YES in step S201), the process proceeds to step S202.

Step S202

The control unit 113 determines whether the external charger 500 connected to the vehicle is outputting power higher than a first threshold. The first threshold is a predetermined power value required for the predetermined control related to starting of the vehicle (e.g., READY-ON). The first threshold may be a voltage value or a current value instead of the power value. When the control unit 113 determines that the external charger 500 is outputting power higher than the first threshold (YES in step S202), the process proceeds to step S203. When the control unit 113 determines that the external charger 500 is not outputting power higher than the first threshold (output is equal to or less than the first threshold) (NO in step S202), the process returns to step S201.

Step S203

The detection unit 112 determines whether the predetermined signal has been detected. Specifically, it is determined whether communication has been established between HV-ECUs included in the devices 410, 420 and the battery monitoring ECU 100. When the detection unit 112 determines that the predetermined signal has been detected (YES in step S203), the process proceeds to step S204. When the detection unit 112 determines that the predetermined signal has not been detected (NO in step S203), the process proceeds to step S205.

Step S204

The control unit 113 changes a first time period to be used for determination in the subsequent step S205. Typically, the control unit 113 reduces the first time period (e.g., from four seconds to one second). As an example, this change is made in order to increase the opportunities to start the vehicle by giving priority to connecting the relay 200 over waiting for the output of the external charger 500 to become stable. After the control unit 113 changes the first time period, the process proceeds to step S205.

Results of machine learning may be taken into account when changing the first time period in step S204. As an example, the number of READY-ON operations performed by the user etc. is counted, and the first time period is further reduced when the count value is larger than a predetermined value. As another example, the remaining capacity (state of charge (SOC)) of the battery 300 is detected upon starting of the vehicle by the user etc., and the first time period is further reduced when the remaining capacity of the battery 300 is low.

Step S205

The control unit 113 determines whether the voltage difference across the relay 200 has been continuously less than a second threshold for the first time period or more. The voltage difference across the relay 200 is the difference (Va-Vb) between a voltage value Va at the terminal of the relay 200 connected to the external charger 500 and a voltage value Vb at the terminal of the relay 200 connected to the battery 300 (physical quantity of the battery 300). The voltage value Va and the voltage value Vb are acquired by the acquisition unit 111. The second threshold is a predetermined value that is set to avoid such a current that affects the vehicle from instantly flowing from the external charger 500 toward the battery 300 when the relay 200 is connected. The first time period is standby time for determining whether the voltage difference across the relay 200 has been continuously stably less than the second threshold. When the control unit 113 determines that the voltage difference across the relay 200 has been continuously less than the second threshold for the first time period or more (YES in step S205), the process proceeds to step S206. When the control unit 113 determines that the voltage difference across the relay 200 has not been continuously less than the second threshold for the first time period or more (NO in step S205), the process returns to step S202.

Step S206

The control unit 113 switches the relay 200 to the conducting state (ON) in which the relay 200 is electrically connected. After the control unit 113 switches the relay 200 to the conducting state, the relay control ends. Thereafter, the vehicle transitions to a state in which the vehicle can be started, such as READY-ON state.

As described above, in the relay control of the first example, when establishment of communication between the vehicle and the battery pack can be recognized, priority is given to connecting the relay 200 over determining whether the voltage difference across the relay 200 continues to be stable. Accordingly, the vehicle can be started even when the external charger 500 with low output is connected to the vehicle. The opportunities to start the vehicle are therefore increased.

Second Example

The relay control of the second example shown in FIGS. 3A and 3B is started when the relay 200 is switched to the non-conducting state (OFF) in which the relay 200 is electrically disconnected. An example of the situation where the relay 200 is switched to the non-conducting state (OFF), namely the disconnected state, in this second example is when any predetermined abnormality related to the battery 300 (will be described later) has occurred.

Step S301

The control unit 113 determines whether the external charger 500 is connected to the vehicle. This step is similar to step S201 in the first example. When the control unit 113 determines that the external charger 500 is connected to the vehicle (YES in step S301), the process proceeds to step S302.

Step S302

The control unit 113 determines whether the external charger 500 connected to the vehicle is outputting power higher than the first threshold. This step is similar to step S202 in the first example. When the control unit 113 determines that the external charger 500 is outputting power higher than the first threshold (YES in step S302), the process proceeds to step S303. When the control unit 113 determines that the external charger 500 is not outputting power higher than the first threshold (output is equal to or less than the first threshold) (NO in step S302), the process returns to step S301.

Step S303

The determination unit 114 performs battery diagnosis based on the physical quantities of the battery 300 acquired by the acquisition unit 111 to determine whether there is any predetermined abnormality related to the battery 300. After the determination unit 114 performs the battery diagnosis, the process proceeds to step S304.

Step S304

The determination unit 114 determines from the result of the battery diagnosis whether there is any predetermined abnormality related to the battery 300. When there is any abnormality related to the battery 300 at this point, the determination unit 114 determines that this abnormality is a tentative abnormality. When the determination unit 114 determines that there is any predetermined abnormality related to the battery 300 (YES in step S304), the process proceeds to step S305. When the determination unit 114 determines that there is no predetermined abnormality related to the battery 300 (NO in step S304), the process proceeds to step S309.

Step S305

The detection unit 112 determines whether the predetermined signal has been detected. This step is similar to step S203 in the first example. When the detection unit 112 determines that the predetermined signal has been detected (YES in step S305), the process proceeds to step S306. When the detection unit 112 determines that the predetermined signal has not been detected (NO in step S305), the process proceeds to step S307.

Step S306

The control unit 113 changes the first time period to be used for determination in the subsequent step S309. Typically, the control unit 113 increases the first time period (e.g., from four seconds to seven seconds). As an example, this change is made in order to reliably detect an abnormality at the stage of a tentative abnormality by delaying the time at which it is confirmed in later step S309 that there is an abnormality related to the battery 300. The battery diagnosis is periodically performed by this relay control even after the battery 300 is connected. Therefore, increasing the first time period is also effective in reducing a decrease in diagnosis accuracy due to disturbance noise added to the battery diagnosis because the battery 300 is connected quickly, and in restraining the power of the battery 300 from being consumed more than necessary. After the control unit 113 changes the first time period, the process proceeds to step S309.

Results of machine learning may be taken into account when changing the first time period in step S306. As an example, the charging tendency of the user etc. is recorded, and the first time period is further increased when the vehicle is often jump-started using an external battery rather than the external charger 500. As another example, the destination of the vehicle is recorded, and the first time period is further increased when the destination is a place where a high-output charger is likely to be connected to the vehicle.

Step S307

The determination unit 114 determines whether a second time period has elapsed since it was determined that the abnormality related to the battery 300 was a tentative abnormality. This second time period is predetermined standby time for confirming that the tentative abnormality is an actual abnormality, and is set as desired according to the content of the battery diagnosis etc. The second time period may be the same as or different from the first time period. The second time period may be changed together with the first time period in step S306. When the determination unit 114 determines that the second time period has elapsed (YES in step S307), the process proceeds to step S308. When the determination unit 114 determines that the second time period has not elapsed (NO in step S307), the process returns to step S303.

Step S308

The determination unit 114 confirms that there is a predetermined abnormality related to the battery 300 (actual abnormality). When the determination unit 114 confirms that there is a predetermined abnormality related to the battery 300, this relay control ends without connecting the relay 200.

Step S309

The control unit 113 determines whether the voltage difference across the relay 200 has been continuously less than the second threshold for the first time period or more. This step is similar to step S205 in the first example. When the control unit 113 determines that the voltage difference across the relay 200 has been continuously less than the second threshold for the first time period or more (YES in step S309), the process proceeds to step S310. When the control unit 113 determines that the voltage difference across the relay 200 has not been continuously less than the second threshold for the first time period or more (NO in step S309), the process returns to step S302.

Step S310

The control unit 113 switches the relay 200 to the conducting state (ON) in which the relay 200 is electrically connected. After the control unit 113 switches the relay 200 to the conducting state, the relay control ends. Thereafter, the vehicle transitions to a state in which the vehicle can be started, such as READY-ON state.

As described above, in the relay control of the second example, in the case where it is unclear if there is an abnormality related to the battery 300, priority is given to determining whether there is an abnormality related to the battery 300 over connecting the relay 200, when establishment of communication between the vehicle and the battery pack can be recognized. Accuracy of diagnosis of the battery 300 can thus be expected to improve.

Operations and Effects

As described above, the control device according to the embodiment of the present disclosure dynamically controls when to switch the relay provided between the battery and the plurality of devices from the non-conducting state (OFF) to the conducting state (ON), based on the physical quantities of the battery and whether communication between the vehicle and the battery pack has been established. The control device according to the embodiment of the present disclosure dynamically controls when to switch the relay provided between the battery and the plurality of devices from the non-conducting state (OFF) to the conducting state (ON), based also on whether there is any abnormality related to the battery.

By these controls, switching of the relay from the disconnected state to the connected state can be appropriately controlled according to the condition of the vehicle.

Although one embodiment of the technique of the present disclosure is described above, the present disclosure can be interpreted not only as a control device but also as a control method that is performed by a control device including a processor and a memory, a control program of the control method, a computer-readable non-transitory storage medium having the control program stored therein, a vehicle equipped with a control device, etc.

The control device etc. of the present disclosure can be used for controlling a battery mounted on a vehicle.

What is claimed is:

1. A control device that controls a battery mounted on a vehicle, the control device comprising one or more processors configured to:
   receive, via a communication network, a physical quantity of the battery detected by one or more sensors that are mounted on the vehicle, the physical quantity including a voltage, a current, and a temperature of the battery;
   disconnect a relay in response to the physical quantity exceeding a predetermined value, the relay being provided between the battery and a predetermined device to which power is supplied from the battery;
   detect a signal indicating that communication has been established between the control device and a system involved in operation of the vehicle;
   change, while the relay is in a disconnected state, a length of a first time period in response to detecting the signal, the first time period being a standby time before connecting the relay:
   connect the relay when a voltage difference between one end and another end of the relay has been continuously less than a predetermined voltage value for the first time period without the signal being detected; and
   connect the relay when the signal is detected and the voltage difference between the one end and the another end of the relay has been continuously less than the predetermined voltage value for the changed first time period.

2. The control device according to claim 1, wherein the one or more processors are further configured to:
   determine a state of the battery; and
   maintain the disconnected state of the relay when determination is made while the relay is in the disconnected state that the battery has an abnormality.

3. The control device according to claim 2, wherein the one or more processors are further configured to:
   determine that the battery is tentatively abnormal in response to detection of a predetermined state; and
   determine that the battery has the abnormality when the battery has been continuously tentatively abnormal for a second time period.

4. The control device according to claim 3, wherein the one or more processors are further configured to, when the signal is detected in a state where the battery is determined to be tentatively abnormal, change the first time period to a different value from the first time period used when the signal is not detected.

5. The control device according to claim 1, wherein the one or more processors are further configured to reduce the first time period when the signal is detected as compared to when the signal is not detected.

6. The control device according to claim 1, wherein the one or more processors are further configured to maintain the disconnected state of the relay when the relay is in the disconnected state and an output of an external charger connected to the battery via the relay is equal to or less than a predetermined value.

7. A control method that is performed by a computer of a control device that controls a battery mounted on a vehicle, the control method comprising:
   receiving, via a communication network, a physical quantity of the battery detected by one or more sensors that are mounted on the vehicle, the physical quantity including a voltage, a current, and a temperature of the battery;
   disconnecting a relay in response to the physical quantity exceeding a predetermined value, the relay being provided between the battery and a predetermined device to which power is supplied from the battery;
   detecting a signal indicating that communication has been established between the control device and a system involved in operation of the vehicle;
   changing, while the relay is in a disconnected state, a length of a first time period in response to detecting the signal, the first time period being a standby time before connecting the relay;
   connecting a relay when a voltage difference between one end and another end of the relay has been continuously less than a predetermined voltage value for the first time period without the signal being detected; and
   connecting the relay when the signal is detected and the voltage difference between the one end and the another end of the relay has been continuously less than the predetermined voltage value for the changed first time period.

8. A non-transitory storage medium storing instructions that are executable by one or more processors of a control device that controls a battery mounted on a vehicle and that cause the one or more processors to perform functions comprising:
   receiving, via a communication network, a physical quantity of the battery detected by one or more sensors that are mounted on the vehicle, the physical quantity including a voltage, a current, and a temperature of the battery;
   disconnecting a relay in response to the physical quantity exceeding a predetermined value, the relay being provided between the battery and a predetermined device to which power is supplied from the battery;
   detecting a signal indicating that communication has been established between the control device and a system involved in operation of the vehicle;
   changing, while the relay is in a disconnected state, a length of a first time period in response to detecting the signal, the first time period being a standby time before connecting the relay;
   connecting a relay when a voltage difference between one end and another end of the relay has been continuously less than a predetermined voltage value for the first time period without the signal being detected; and
   connecting the relay when the signal is detected and the voltage difference between the one end and the another end of the relay has been continuously less than the predetermined voltage value for the changed first time period.

\* \* \* \* \*